United States Patent [19]
Tatsumi

[11] Patent Number: 5,874,814
[45] Date of Patent: Feb. 23, 1999

[54] BRUSHLESS MOTOR DRIVEN BY APPLYING VARYING DRIVING SIGNALS

[75] Inventor: Hiroshi Tatsumi, Tenri, Japan

[73] Assignee: Sharp Kabushiki Kaisha, Osaka, Japan

[21] Appl. No.: 820,892

[22] Filed: Mar. 19, 1997

[30] Foreign Application Priority Data

Mar. 29, 1996 [JP] Japan .................................. 8-075770

[51] Int. Cl.$^6$ .................................................. H02P 7/00
[52] U.S. Cl. .......................................... 318/254; 318/439
[58] Field of Search ................................. 318/254, 439, 318/138

[56] References Cited

U.S. PATENT DOCUMENTS

| | | | |
|---|---|---|---|
| 3,697,954 | 10/1972 | Maxe .................................. | 340/825.89 |
| 4,633,150 | 12/1986 | Inaji et al. .............................. | 318/254 |
| 4,760,315 | 7/1988 | Nanae et al. ........................... | 318/254 |
| 5,140,232 | 8/1992 | Naito ...................................... | 318/138 |
| 5,162,709 | 11/1992 | Ohi ......................................... | 318/254 |
| 5,182,500 | 1/1993 | Shimada ................................. | 318/254 |
| 5,363,024 | 11/1994 | Hiratsuka et al. ..................... | 318/254 |

FOREIGN PATENT DOCUMENTS 61-59077 12/1986 Japan .
4038189 2/1992 Japan .

*Primary Examiner*—Jonathan Wysocki

[57] ABSTRACT

A brushless motor driving device includes a comparator. The comparator compares a control voltage with a control signal in proportion to a control current of each Hall element. An output of the comparator is amplified by a Hall element driving amplifier, and is inputted to a control current terminal of each Hall element as an error signal. Each Hall element outputs a Hall signal based on an inputted error signal. The driving voltage is controlled such that an amplified Hall signal matches with a driving voltage applied to each driving coil. The brushless motor driving device permits a brushless motor to be stably driven at any rotation speed from low-speed rotations till high-speed rotations with a simple circuit structure.

10 Claims, 5 Drawing Sheets

CONTROL VOLTAGE VS. STARTING TORQUE

BRUSHLESS MOTOR DRIVEN BY APPLYING VARYING DRIVING SIGNALS

FIELD OF THE INVENTION

The present invention relates to a brushless motor driving device for use in, for example, reel-to-reel driving in digital video cassette recorders.

BACKGROUND OF THE INVENTION

In recent days, in the field of digital magnetic recording and reproducing apparatuses (for example, digital video cassette recorders (hereinafter referred to as VCRs)) which adopt a magnetic tape medium, high density recording and a quick search function have been demanded to attain long time recording and quick access respectively. When carrying out quick access, it is the aim to increase the tape speed and at the same time ensure constant tension control.

In general, for the brushless motor driving device for use in driving both take-up and supply reels, a linear driving based on a sine wave which generates little torque ripple is suited in consideration of variations in tension.

The sine wave driving may be performed by a circuit of a simple structure, for example, by a method of utilizing sine wave outputs obtained from a plurality of Hall elements as coil terminal voltages to be applied to respective phases in the motor. In this method, it is required that an N electrode and an S electrode are alternately provided on the rotor side, to generate a magnetic field in such a manner that a change in magnetic force in response to the rotations of the motor forms a sine wave. The respective outputs of a plurality of Hall elements are amplified by the corresponding Hall amplifiers, and the resulting amplified outputs are applied to coil terminals of the respective phases in the motor.

An example structure of the three-phase brushless motor driving device will be explained below.

FIG. 4 shows the structure of the three-phase brushless motor driving device. In FIG. 4, U, V and W respectively indicate balanced 3-phase windings (driving coil) which are Y-connected on the motor stator side, and Hall elements $H_u$, $H_v$, and $H_w$ are provided on the stator side around the circumference of the permanent magnet mounted to the rotor, in such a manner that respective adjoining Hall elements have a phase difference of 120°.

The amplitude of a Hall signal is too small to apply a sufficient driving current to the driving coils U, V, and W. Therefore, it is required to amplify the Hall signal by a differential amplifier. In the figure, a driving current supply circuit 411 is composed of three differential amplifiers 418, 419 and 420. The drive current supply circuit 411 supplies a driving current to the driving coils U, V and W by differential-amplifying two output signals of the Hall element, which have opposite polarities.

For example, a voltage $U_{out}$ to be applied to a U-phase winding in the motor may be obtained by differentiating sine wave signals to be outputted from the Hall element $H_u$. Similarly, the voltage $V_{out}$ to be applied to a V-phase winding is also obtained by differential-amplifying a sine wave signal of the Hall element $H_v$, and the voltage $W_{out}$ to be applied to a W-phase winding is obtained by differential-amplifying a sine wave signal of the Hall element $H_w$.

Other than the above method, a method of generating driving voltages $U_{out}$, $V_{out}$ and $W_{out}$ from signals of the Hall elements $H_u$, $H_v$ and $H_w$ may be adopted. To be specific, as is clear from the equations $U_{out}=H_u-H_v$, $V_{out}=H_v-H_w$, and $W_{out}=H_w-H_u$, a method of utilizing a difference in output signals of the adjoining two Hall elements as a driving voltage to be applied to each phase in the motor has been proposed (Japanese Unexamined Patent Publication No. 38189/1992 (Tokukaihei 4-38189)).

The respective terminal voltages $U_{out}$, $V_{out}$, and $W_{out}$ to be outputted from the driving current supply circuit 411 are sent to a full-wave rectifying circuit 415, and are rectified into one direction. Furthermore, an output from the full-wave rectifying circuit 415 is supplied to a smoothing circuit 416, and is converted into a DC voltage $V_{mt}$ in which three-phase voltages of the motor are composed.

Then, a control voltage $V_{ctr}$ from an input terminal 401 of the driving device and an output voltage $V_{mt}$ from the smoothing circuit 416 are sent to a comparator 402, and an error signal between the control voltage $V_{ctr}$ and the output voltage $V_{mt}$ is outputted. The resulting error signal is sent to one of input terminals 404a of a switch 404 and to an inverting amplifier 403. To the other input terminal 404b of the switch 404, an output of the inverting amplifier 403 is sent. The switch 404 is switched between a non-inverting signal of an error signal and an inverting signal of the error signal from the comparator 402, and the switched signal is sent to the Hall element driving amplifier 405.

In the Hall element driving amplifier 405, a non-inverting output terminal 405a is connected to one of the control current terminals of the Hall element via a resistor 406, and an inverting output terminal 405b is connected to the other control current terminal of the Hall element via a resistor 407.

As described, according to the driving device, the output voltage of the Hall element is controlled by the feedback control arrangement for controlling the control voltage to be applied to the control current terminal of the Hall element so that the control voltage $V_{ctr}$ and the output voltage $V_{mt}$ of the smoothing circuit 416 are equivalent.

Additionally, the voltage to be applied to the winding of the brushless motor is determined by an output voltage of the Hall element, and the rotating direction of the motor is determined by altering the direction of the control current flowing in the Hall element by inverting the polarity of the error signal to be inputted to the Hall element driving amplifier 405.

However, the conventional brushless motor driving device requires a high closed-loop gain to achieve an improved function of the feedback control. As a result, a response sensitivity of an output signal to the input signal of the driving device increases, and a wide dynamic range of the input signal cannot be ensured.

The conventional brushless motor driving device also has the following drawbacks. As a time constant of the smoothing circuit is fixed, a proportional amount of feedback of the motor terminal voltage cannot be obtained over a range of rotations from low-speed rotations to high-speed rotations, and a non-linear element becomes large.

Furthermore, when driving the driving device at low motor terminal voltage (in a vicinity of 0[V]), due to an absence of an error signal, the driving voltage may not be controlled by the control voltage.

SUMMARY OF THE INVENTION

In view of the foregoing, an object of the present invention is to provide a brushless motor driving device which permits a brushless motor for use in, for example, driving the reels in a VCR, etc., to be driven at any rotation speed from low-speed rotations till high-speed rotations with a simple circuit structure.

In carrying out the above and other objects of the present invention, there is provided in one form a brushless motor driving device for driving a brushless motor respectively by applying driving signals, which vary in response to output signals of a plurality of Hall elements, to corresponding driving coils by applying driving signals of a plurality of Hall elements, which have the following arrangement.

The control voltage driving device includes (1) the first feedback circuit that matches output signals of each Hall element with a rotation number control signal indicative of a target number of rotations of the brushless motor; (2) a plurality of amplifying circuits that amplify the corresponding output signals of the Hall element and output an amplified output signal; and (3) a second feedback circuit that matches each driving signal with the corresponding amplified output signal.

In the described arrangement, the first feedback circuit permits an output signal of each Hall element to be matched with the rotation number control signal. This permits the amplitude and a direction of a control current flowing through the Hall element to be necessarily determined only by adjusting the rotation number control signal indicative of a desired number of rotations of the brushless motor. The described brushless motor driving means eliminates a need of a signal for switching a rotating direction of the brushless motor, that is required in the conventional driving device, and enables the brushless motor to be controlled continuously and stably from normal rotations to reverse rotations only by the rotation number control signal.

Moreover, as the second feedback circuit permits each driving signal to be matched with the corresponding amplified output signal, not only when driving the brushless motor but also when regenerative braking, a required driving current can be applied to the driving coil in any direction as desired, thereby permitting stable rotations of the brushless motor.

In the described arrangement, it is preferable that the first feed back circuit includes a resistor that generates voltages, which vary in response to a current flowing through the Hall element, and that the voltages generated across the resistor are fed back to the rotation number control signal.

In this case, the amplitude of an output signal of the Hall element and an available range of the rotation number control signal corresponding to the rotation number control signal of the brushless motor can be determined as desired only by the value of the resistor, thereby providing a versatile brushless motor suitable for use with a wide range of motor capacities.

For a fuller understanding of the nature and advantages of the invention, reference should be made to the ensuing detailed description taken in conjunction with the accompanying drawings.

DESCRIPTION OF THE EMBODIMENTS

Figure 1:
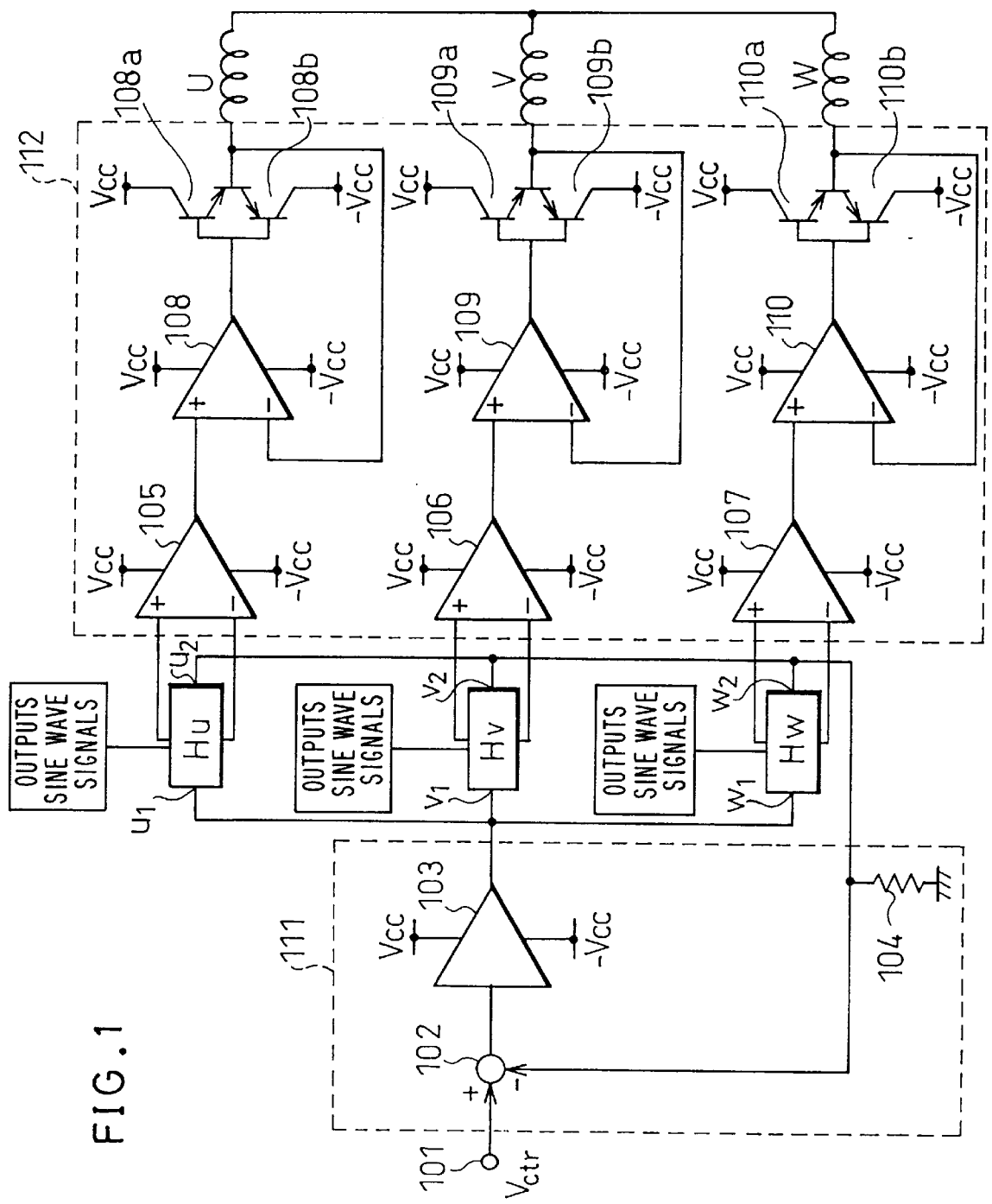
FIG. 1 is a circuit diagram illustrating an example arrangement of a brushless motor driving device in accordance with the present invention.
Figures 2A, 2B:
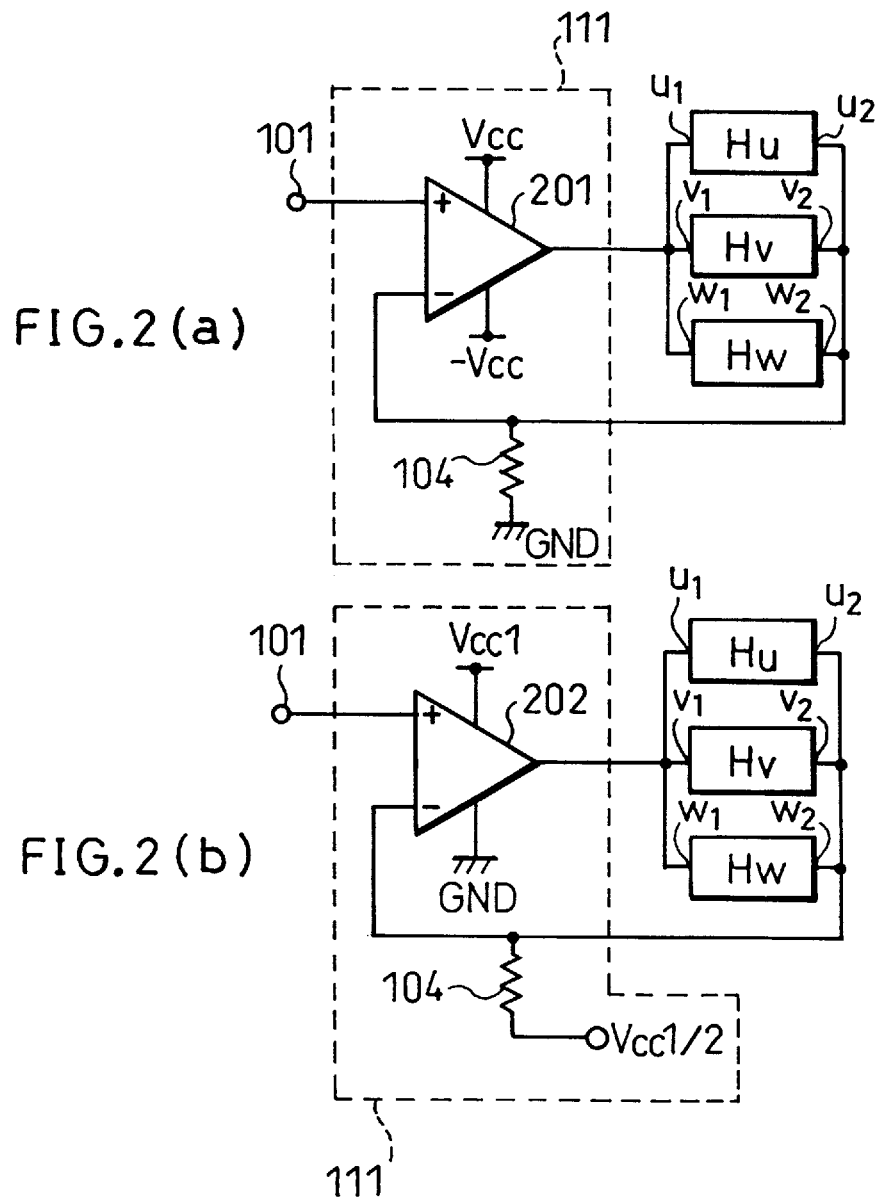
FIG. 2(a) and FIG. 2(b) are circuit diagrams illustrating the structure of Hall element driving means of FIG. 1 in detail.
Figure 3:
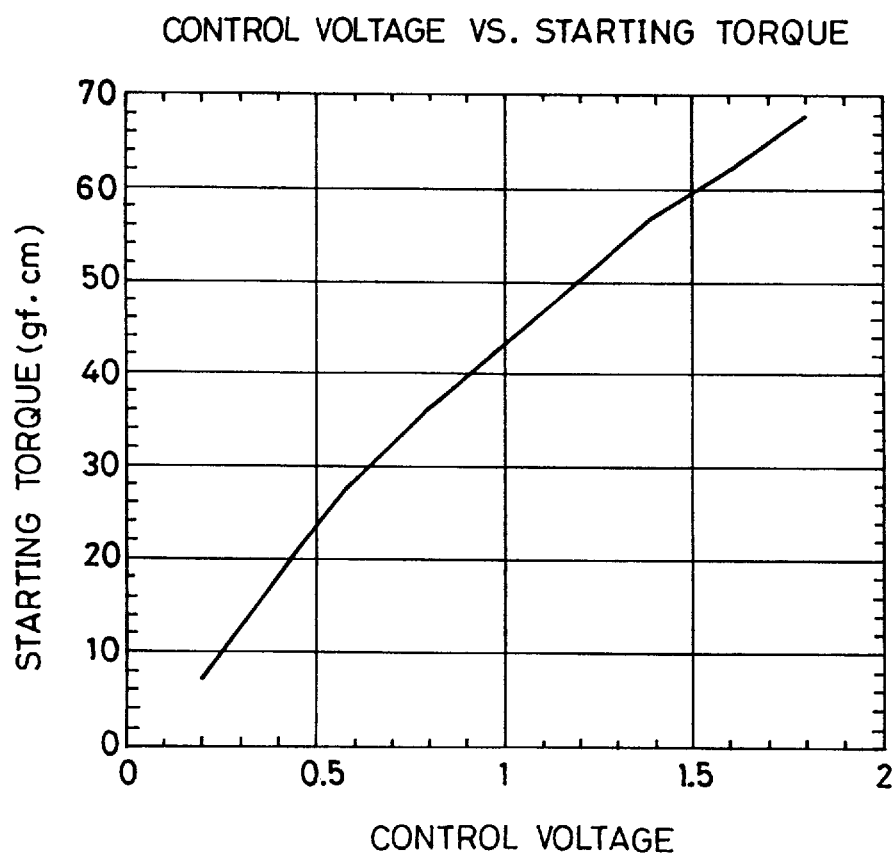
FIG. 3 is an explanatory view showing a correlation between a starting torque of a motor and a control voltage of a brushless motor driving device of FIG. 1.
Figure 4:
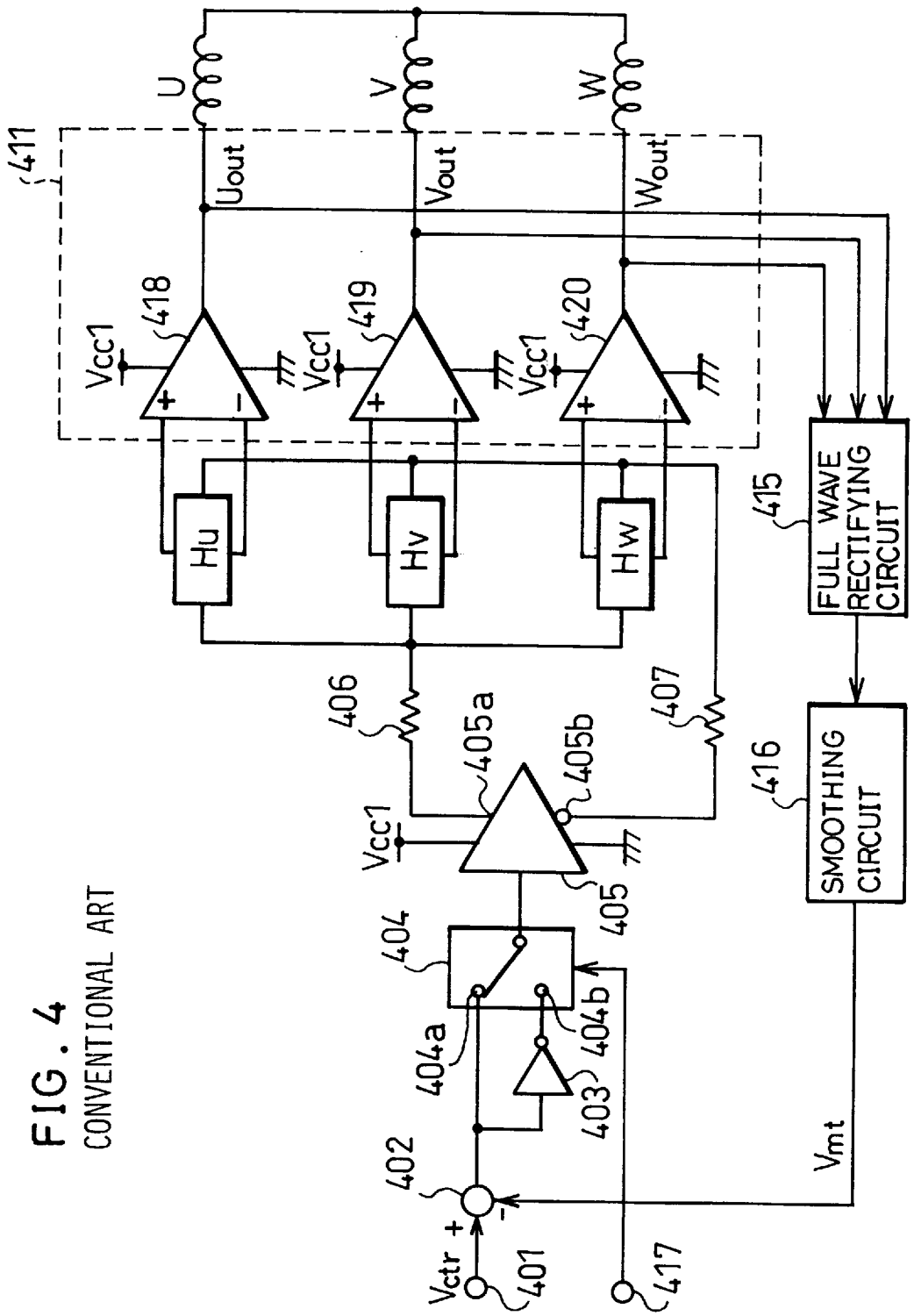
FIG. 4 is a circuit diagram illustrating an example arrangement of a conventional brushless motor driving device.

The following descriptions will discuss one embodiment of the present invention in reference to FIG. 1 through FIG. 3.

FIG. 1 shows an example structure of a brushless motor driving device in accordance with the present embodiment. Here, explanations will be given through the case of adopting a driving circuit having both positive and negative power sources.

The brushless motor driving device generates terminal voltages of each phase in the motor using sine wave outputs from Hall elements $H_u$, $H_v$, and $H_w$. In FIG. 1, a comparator 102 is connected to an input terminal 101 and control current terminals $u_2$, $v_2$, and $w_2$ of the Hall elements $H_u$, $H_v$, and $H_w$. The comparator 102 compares the control voltage $V_{ctr}$ from the input terminal 101 with the voltage (control signal) in proportion to the control current of the Hall elements $H_u$, $H_v$, and $H_w$, and outputs the resulting difference.

A resistor 104 (control signal generation means) is a detection resistor for detecting a control current flowing through the Hall elements $H_u$, $H_v$, and $H_w$, and one end of the detection resistor 104 is connected to one end of the control current terminal of the Hall element and to an inverting input terminal of the comparator 102, and the other end of the detection resistor 104 is connected to ground of the circuit.

A difference output of the comparator 102 is sent to a Hall element driving amplifier 103 to be amplified, and the resulting amplified difference output is sent to the control current terminals $u_1$, $v_1$, and $w_1$ of the Hall elements $H_u$, $H_v$, and $H_w$ as a difference signal. The comparator 102 and the Hall element driving amplifier 103 constitute error signal generation means.

The comparator 102, the Hall element driving amplifier 103 and the resistor 104 constitute Hall element driving means 111.

The amplitude of the Hall signals from the Hall elements $H_u$, $H_v$ and $H_w$ are too small to supply a sufficient driving current to the driving coils U, V and W of the motor, and this necessitates an amplifications of the respective Hall signals.

In the driving device, the amplifications are performed by a driving current supply source 112 (driving signal generation means). The driving current supply source 112 is composed of three differential amplifiers 105, 106 and 107, three operational amplifiers 108, 109 and 110, and six transistors 108a, 108b, 109a, 109b, 110a and 110b.

The differential amplifiers 105, 106, and 107 amplify the weak Hall signals to a voltage level at which the motor can be driven. The respective gains of the differential amplifiers 105, 106 and 107 may be the same, but a gain adjusting part constituted by a variable resistor, etc., may be added to the three differential amplifiers for the purpose of compensating for variations in amplitude of the Hall element outputs of the three phases.

The respective signals amplified by the differential amplifiers 105, 106 and 107 are sent to the non-inverting input terminals of the operation amplifiers 108, 109 and 110, to be computed with feedback signals (to be described later) to be sent to the inverting input terminals. In the post stage of the operation amplifiers 108, 109 and 110, the first transistors 108a, 109a and 110a and the second transistors 108b, 109b and 110b which are connected in series so as to provide three emitter followers between a positive power source $V_{cc}$ and a negative power source $-V_{cc}$.

Each connection point of the first and second transistors, i.e., an emitter terminal is connected to one end of each of the driving coils U, V and W. The emitter terminals are connected to the corresponding inverting input terminals of the operational amplifiers 108, 109 and 110 as transmitting and receiving feedback signals. As a result, an amplified Hall signal can be matched with a driving voltage to be applied to the driving coils U, V and W of respective phases.

As described, in the present embodiment, the Hall element driving means 111 amplifies a difference between the control voltage $V_{ctr}$ and the voltage in proportion to the control current to be flown in the control current terminals $u_2$, $v_2$ and $w_2$ of the Hall elements $H_u$, $H_v$ and $H_w$, and sends a resulting amplified difference to the control current terminals $u_1$, $v_1$ and $w_1$ of the Hall elements $H_u$, $H_v$, and $H_w$ respectively. Thus, only by controlling the control voltage $V_{ctr}$, the amplitude and the direction of the control current flowing through the Hall elements $H_u$, $H_v$ and $H_w$ can be necessarily determined. Namely, a signal for switching a rotation direction of the brushless motor required in the conventional arrangement can be eliminated, and a brushless motor can be controlled continuously from normal rotations till reverse rotations only by the control voltage $V_{ctr}$.

Moreover, as each amplified Hall signal can be matched with the corresponding driving voltage to be applied to the driving coils U, V and W of respective phases, a current required for not only driving but also regenerative braking the motor may be applied in any direction as desired. As a result, the motor can be stably rotated.

Additionally, the amplitude of the Hall element output and an available range of the control voltage can be determined as desired based on only the value of the detected resistance with respect to the control voltage of the brushless motor, thereby providing a versatile brushless motor driving device suitable for use with a wide range of motor capacities.

In the case where the brushless motor driving device is used in driving the reels in a magnetic recording and reproducing apparatus which adopts a magnetic tape, such as VCR, etc., (as a reel motor), when carrying out quick access, it is required that a take-up reel motor generates a sufficient accelerating torque for rewinding the magnetic tape even when driving the reels at high speed. On the other hand, it is also required that the supply reel motor controls the torque of the supply reel motor according to the diameter of the supply reel so as to ensure an appropriate tape tension, for example, ranging from 5[gf] through 10[gf] even when carrying out quick access.

Here, the supply reel motor is driven in an control area and a regenerative area. Therefore, the rotations of the reel motor are required to be controlled accurately even when driving at low voltage. According to the brushless motor driving device in accordance with the present embodiment, as the brushless motor can be stably rotated as described above, a stable reel driving can be performed at any rotation speed from the low-speed rotations till high-speed rotations when carrying out quick search in the magnetic recording and reproducing apparatus, and the tension of the magnetic tape can be controlled with ease and with high precision.

Figure 5:
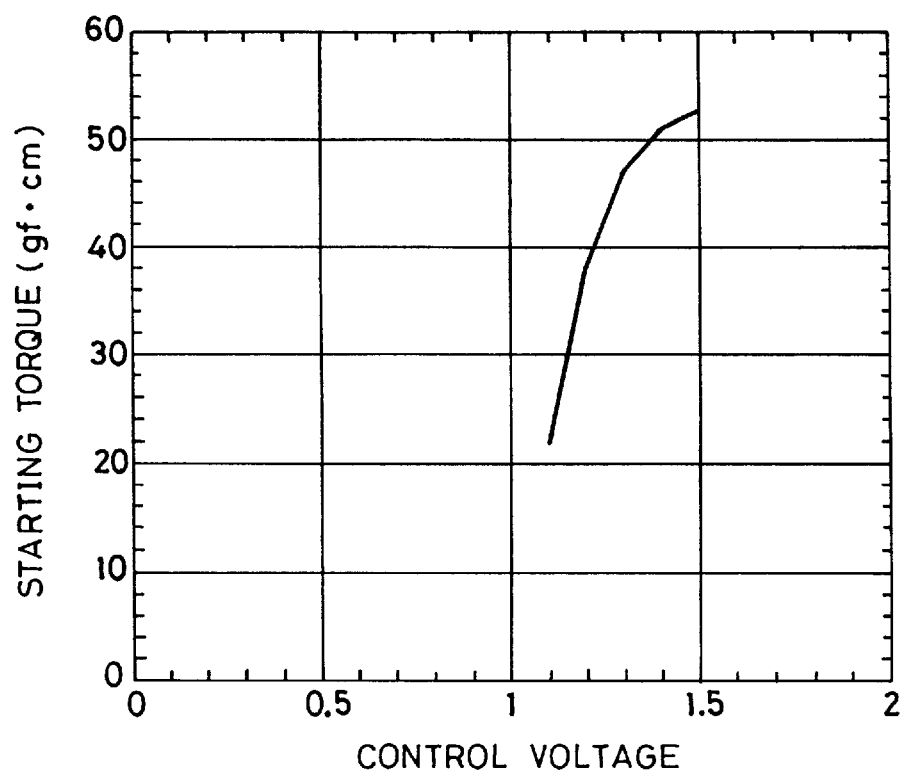
FIG. 5 is an explanatory view showing a correlation between a starting torque of a motor and a control voltage of a driving device for the conventional brushless motor.

Next, using the driving device of the brushless motor having the arrangement of FIG. 1, the correlation between the starting torque and the control voltage $V_{ctr}$ is measured, and the results are summarized in FIG. 3. FIG. 5 shows results of comparative experiment using the conventional driving device (commercially available driver IC). The motor used in the experiment is arranged such that a winding of a stator thereof is three-phase Y-connected, and a rotor thereof has permanent magnets of 8 poles in total in a sine wave form in which N-poles and S-poles are alternately provided.

As can be seen from FIG. 5, in the arrangement of the conventional driving device, with an applied control voltage of less than around 1.1 [V], it becomes unable to control the driving device. The conventional driving device shows remarkable non-linearity, and has a very narrow applicable range of the control voltage $V_{ctr}$, i.e., from around 1.1 [V] to 1.5 [V], and a saturation of the starting torque starts with an applied control voltage of around 1.3 [V]. In contrast, as can be seen from FIG. 3, the driving device of the present embodiment shows an excellent linearity and a wide applicable range of the control voltage $V_{ctr}$, i.e., from around 0.2 [V] to 1.8 [V].

Next, an example circuit structure of the Hall element driving means 111 shown in FIG. 1 will be explained. FIG. 2(a) shows one example of the circuit structure. A control voltage $V_{ctr}$ from the input terminal 101 is inputted to the non-inverting input terminal of an operational amplifier 201. An output from the control current detection means constituted by the detection resistor 104 is inputted to the inverting input terminal of the operational amplifier 201, thereby allowing a control current to flow in the Hall element in proportion to the control voltage $V_{ctr}$. 20. FIG. 2(b) shows another example of the circuit structure of the Hall element driving means 111 which adopts a single power source $V_{cc1}$. In this arrangement, the other end of the detection resistor 104 is connected to a reference voltage having a half ($V_{cc1}/2$) of the power source voltage. In this point, the structure shown in FIG. 2(b) differs from that of FIG. 2(a). However, the basic operations of the circuit shown in FIG. 2(b) are the same as those shown in FIG. 2(a). Thus, detailed descriptions thereof Hall be omitted.

In the brushless motor driving device shown in FIG. 1, the driving current supply source 112 constituted by both positive and negative power sources may be arranged so as to have a single power source.

Although explanations have been given through the three-phase brushless motor driving device, the present invention is not limited to this, and is generally applicable to the brushless motor driving device having a multiple-phase brushless motor.

As described, a brushless motor driving device in accordance with the present invention which drives a brushless motor by applying driving signals to a plurality of driving coils based on Hall signals from a plurality of Hall elements, is characterized by including: (1) control signal generation means for generating a control signal from the control current of the Hall element, the control signal generation means being connected to one end of the control current terminal of the Hall element; (2) error signal generation means for generating an error signal by detecting a difference between a control signal for controlling a number of rotations of the brushless motor and the control signal, and supplying the resulting error signal to the other end of the control current terminal of the Hall element; and (3) driving signal generation means including a feedback control system, for generating the driving signal based on the Hall signal from the Hall element.

According to the described arrangement, rotations of the brushless motor can be controlled almost continuously from normal rotations till reverse rotations only by controlling or adjusting a control voltage. This permits a necessary current to flow therein not only when driving the brushless motor but also when regenerating. Therefore, by adopting the brushless motor to drive the reels in the magnetic recording and reproducing apparatus which adopts the magnetic tape, such as VCR, etc., the tension of the magnetic tape can be controlled with ease at any rotation speed from low-speed rotations till high-speed rotations at quick search.

Another brushless motor driving device in accordance with the present invention having the described arrangement may be characterized in that: the control signal generation means is a resistor connected to one end of the control current terminal of the Hall element in series, and generates the control signal across the resistor due to a drop in voltage.

According to the described arrangement, the amplitude of an output of the Hall element with respect to the control voltage of the brushless motor and an available range of the control voltage can be determined as desired based on only a value of the detection resistor, thereby providing a versatile brushless motor driving device suitable for use with a wide range of motor capacities.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A brushless motor driving device for driving a brushless motor by applying driving signals, which vary in response to output signals of a plurality of Hall elements, to corresponding driving coils comprising:

a first feed back circuit including a summer into which output signals of each Hall element are input along with a rotation number control signal indicative of a target number of rotations of said brushless motor;

a plurality of amplifying circuits, each amplifying circuit directly connected to the Hall element, and amplifying the corresponding output signals of the Hall element, a second feedback circuit including operational amplifiers for summing amplified signals from the Hall elements and subtracting said driving signals.

2. The brushless motor driving device as set forth in claim 1 wherein:

said first feedback circuit includes only a single resistor which generates voltages thereacross, the voltages varying in response to currents flowing through the Hall elements, and the voltages across said resistor are fed back to the rotation number control signal to be equal therewith.

3. The brushless motor driving device as set forth in claim 2 wherein:

said first feedback circuit further includes a differential amplifying circuit that has an inverting input terminal, a non-inverting input terminal and an output terminal, and said Hall element has first and second control current terminals, wherein the voltages generated across the resistor are applied to said inverting input terminal, while the rotation number control signal is inputted to said non-inverting input terminal, said inverting input terminal is connected to said first control current terminal, while said output terminal is connected to said second control current terminal, and the voltages generated across said resistor are fed back to said rotation number control signal.

4. The brushless motor driving device as set forth in claim 3 wherein:

said differential amplifying circuit is operated by a second power source having the same power as a first power source and an opposite polarity to said first power source, and said resistor is provided between said inverting input terminal and ground.

5. The driving device as set forth in claim 3 wherein:

said differential amplifying circuit operates by a first power source, one end of said resistor is connected to the inverting input terminal, while the other end of said resistor is connected to a second power source having a half voltage of that of said first power source and the same polarity as that of said first power source.

6. The brushless motor driving device as set forth in claim 1 wherein:

said second feedback circuit further includes differential amplifying circuits, each having an inverting input terminal, a non-inverting input terminal and an output terminal;

the amplified output signal is inputted to the non-inverting input terminal;

the driving signals are fed back via said inverting input terminal; and each driving signal is equal to the corresponding amplified output signal.

7. The brushless motor driving device as set forth in claim 2 wherein:

said second feedback circuit further includes differential amplifying circuits, each having an inverting input terminal, a non-inverting input terminal and an output terminal;

the amplified output signal is inputted to the non-inverting input terminal;

the driving signals are fed back via said inverting input terminal; and each driving signal is equal to the corresponding amplified output signal.

8. The brushless motor driving device as set forth in claim 3 wherein:

said second feedback circuit further includes differential amplifying circuits, each having an inverting input terminal, a non-inverting input terminal and an output terminal;

the amplified output signal is inputted to the non-inverting input terminal;

the driving signals are fed back via said inverting input terminal; and each driving signal is equal to the corresponding amplified output signal.

9. The brushless motor driving device as set forth in claim 1, wherein said first feedback circuit includes:

control signal generation means for calculating a sum of currents of output signals from a first control current terminal which is one terminal of each of said Hall elements to obtain a voltage proportional to the sum; and error signal generation means for obtaining an error signal by amplifying a difference between the voltage proportional to the sum and a voltage of said rotation number control signal and outputting the error signal to a second control current terminal which is another terminal of each of said Hall elements.

10. The brushless motor driving device as set forth in claim 1 wherein:

said output signals of the plurality of Hall elements are sine wave signals.

* * * * *